(12) United States Patent
Austin et al.

(10) Patent No.: US 12,464,624 B2
(45) Date of Patent: Nov. 4, 2025

(54) LIGHTING SYSTEMS AND METHODS UTILIZING LIGHTING PROFILES

(71) Applicant: Toyota Motor Engineering & Manufacturing North America, Inc., Plano, TX (US)

(72) Inventors: Benjamin Piya Austin, Saline, MI (US); William Patrick Garrett, Plymouth, MI (US); George M. Evans, Ann Arbor, MI (US); Philip J. Babian, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/322,179

(22) Filed: May 23, 2023

(65) Prior Publication Data

US 2024/0397598 A1    Nov. 28, 2024

(51) Int. Cl.
| | |
|---|---|
| *H05B 47/115* | (2020.01) |
| *B60Q 1/44* | (2006.01) |
| *H04L 67/12* | (2022.01) |
| *H04L 67/306* | (2022.01) |
| *H05B 47/185* | (2020.01) |

(52) U.S. Cl.
CPC ............. *H05B 47/115* (2020.01); *B60Q 1/44* (2013.01); *H04L 67/12* (2013.01); *H04L 67/306* (2013.01); *H05B 47/185* (2020.01)

(58) Field of Classification Search
None
See application file for complete search history.

(56) References Cited

U.S. PATENT DOCUMENTS

| | | | |
|---|---|---|---|
| 10,629,103 B2 | 4/2020 | Forgey | |
| 10,736,370 B2 | 8/2020 | Chen et al. | |
| 10,856,589 B1 * | 12/2020 | Lee | A41D 13/01 |
| 10,999,524 B1 * | 5/2021 | Duelli | G01S 17/894 |
| 11,287,124 B2 | 3/2022 | Maderic | |
| 2005/0134439 A1 * | 6/2005 | Moore | A42B 3/0453 |
| | | | 340/432 |
| 2016/0091188 A1 * | 3/2016 | Milligan | H05B 47/00 |
| | | | 362/105 |

(Continued)

FOREIGN PATENT DOCUMENTS

| | | |
|---|---|---|
| KR | 712739 B1 | 5/2007 |
| KR | 1839702 B1 | 3/2018 |
| KR | 2019111650 A | 10/2019 |

*Primary Examiner* — Wilson Lee
(74) *Attorney, Agent, or Firm* — DINSMORE & SHOHL LLP

(57) ABSTRACT

In one embodiment, a lighting system includes one or more light sources, one or processors, and a non-transitory computer-readable medium storing instructions that, when executed by the one or more processors, causes the one or more processors to: receive a lighting profile for an individual or device within visible range of the lighting system, and control the one or more light sources according to the lighting profile. In another embodiment, a method of operating a lighting system includes receiving, from an individual or a device within a visible range of the individual or device, a lighting profile, and controlling one or more lights of the lighting system according to the lighting profile.

16 Claims, 5 Drawing Sheets

(56) References Cited

U.S. PATENT DOCUMENTS

| | | | |
|---|---|---|---|
| 2021/0068477 A1 | 3/2021 | Johnson | |
| 2021/0122388 A1* | 4/2021 | Qiu | G02B 27/0093 |
| 2021/0153574 A1* | 5/2021 | Greszler | G08B 5/36 |
| 2021/0315289 A1* | 10/2021 | Watson | B60Q 1/381 |
| 2024/0112581 A1* | 4/2024 | Hirano | G08G 1/166 |
| 2024/0412637 A1* | 12/2024 | Inoue | G08G 1/00 |
| 2025/0020853 A1* | 1/2025 | Keller | F21S 43/40 |

\* cited by examiner

LIGHTING SYSTEMS AND METHODS UTILIZING LIGHTING PROFILES

TECHNICAL FIELD

The present specification relates to lighting systems, and more particularly to lighting systems that produce lighting patterns according to a lighting profile.

BACKGROUND

Lighting systems are oftentimes used to draw the attention of an individual. For example, vehicle brake lights are used to draw the attention of a nearby individual to the rear of the vehicle to indicate that the vehicle is slowing down. A lighting vest worn by a runner is used to draw the attention of motorists to the runner so that the motorists can avoid the runner, particularly at night. However, each person responds differently to different lighting patterns. A first person may respond very quickly to a red lighting pattern and another person will respond very quickly to a green lighting pattern, for example. In some cases, a lighting pattern will not be noticeable to a particular individual.

Accordingly, alternative lighting systems may be desired.

SUMMARY

In one embodiment, a lighting system includes one or more light sources, one or processors, and a non-transitory computer-readable medium storing instructions that, when executed by the one or more processors, causes the one or more processors to: receive a lighting profile for an individual or device within visible range of the lighting system, and control the one or more light sources according to the lighting profile.

In another embodiment, a method of operating a lighting system includes receiving, from an individual or a device within a visible range of the individual or device, a lighting profile, and controlling one or more lights of the lighting system according to the lighting profile.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
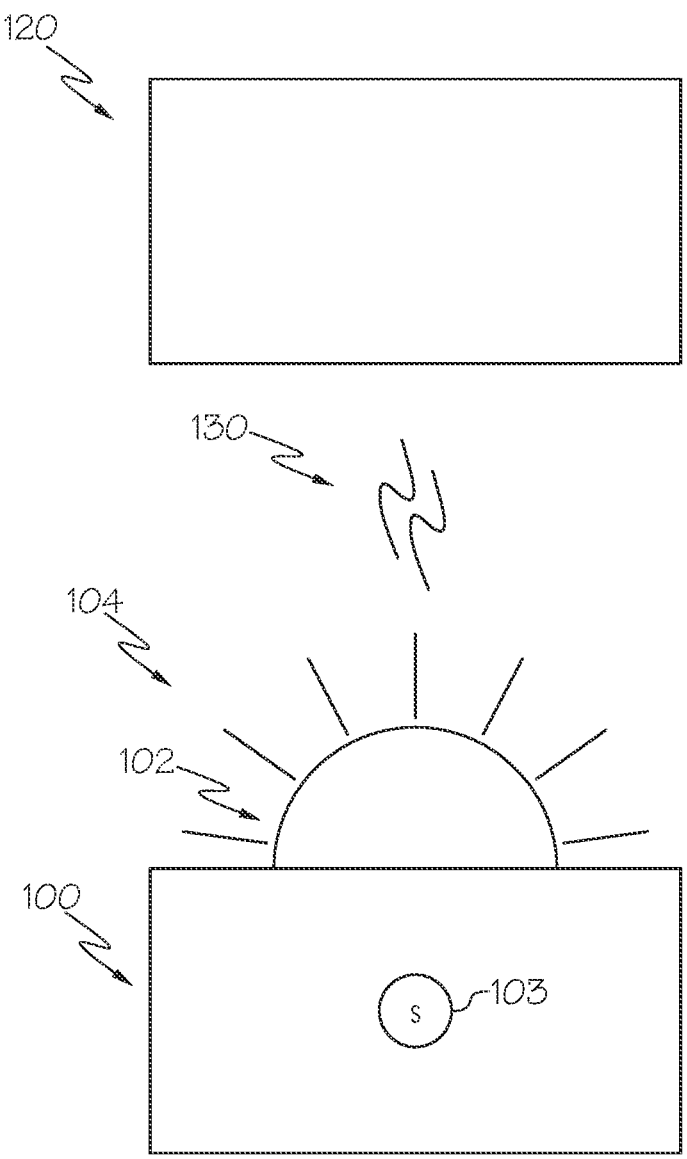
FIG. 1 illustrates an example lighting system and receiver according to one or more embodiments described and illustrated herein.

The embodiments disclosed herein are directed to smart lighting systems that adapt their output to a particular user such that the smart lighting system is readily visible to the particular user. It has been shown that different individuals respond differently to different lighting parameters. Lighting parameters such as wavelength, duty cycle, frequency, ramp-up time (i.e., time to fully illuminate), ramp-down time (i.e., time to darken to a low-brightness state, such as completely off) and brightness, among others, may affect how noticeable the light sources of a lighting system are to different individuals. A first set of lighting parameters may be noticed by a first individual within a first period of time and noticed by a second individual within a second period of time wherein the first period of time and the second period of time are different. Although differences in the time periods where an individual notices a lighting system may be very small (e.g., milliseconds), the time period for noticing a lighting system may be important for safety in certain situations.

As one example, runners often wear lighted running vests that are illuminated with a certain color, or operate at certain patterns (e.g., flashing a single color, flashing multiple colors, and the like). These illuminated running vests increase the visibility to drivers of vehicles on the road. However, drivers of vehicles may notice a lighting running vest illuminated with one pattern more quickly over another pattern. For example, a driver may respond most quickly to a lighting pattern having a light source having a wavelength that is red in color, at a frequency of 10 Hz, and a duty cycle of 60%. A runner (or pedestrian) wearing a lighted running vest having one or more lighting sources that illuminate this pattern will be more quickly visible to a driver than other patterns.

Embodiments of the present disclosure are not limited to lighted running vests. As another example, a vehicle's lighting system may also illuminate according to a lighting pattern that is optimal to nearby vehicles or persons. As a non-limiting example, a vehicle's brake lights may operate according to a lighting pattern that is most optimal with respect to a driver that is driving behind the vehicle. For example, the brake lights may operate a frequency and duty cycle for which the driver of the tailgating vehicle responds most quickly. Thus, the lighting pattern is based on the receptiveness of a particular individual.

As described in more detail below, embodiments of the present disclosure employ a lighting profile of an individual that is transmitted to the lighting system. The lighting profile stores lighting parameters that are personalized to an individual and correspond with a lighting pattern that is most effective for that individual. The lighting profile is transmitted to a lighting system so that the lighting system may operate at a lighting pattern that corresponds with the lighting system.

Various embodiments of lighting systems and methods of operating a lighting system are described in detail below.

Referring now to FIG. 1, an example lighting system 100 and a receiver 120 are schematically illustrated. The lighting system 100 may be any device or system having one or more light sources 102. Non-limiting lighting systems 100 include a lighted vest or other clothing article, a vehicle lighting system, a traffic light, a sign, and a warning light.

The lighting system 100 includes one or more light sources 102 capable of producing optical radiation 104. In the case of a lighted vest, the lighting system 100 may include one or more light emitting diodes (LEDs) capable of producing optical radiation 104 at many wavelengths in the visible spectrum. In some embodiments, the light sources 102 are arranged on the vest and controlled to provide biomotion-animation, which signals human movement to onlookers. The lighting system 100 also includes electronic components capable of receiving a lighting profile, and controlling the one or more light sources 102 to operate according to the received lighting profile.

The receiver 120 is a device associated with an individual that is to receive the lighting pattern of the lighting system 100. Non-limiting examples of receivers 120 may be an electronic control unit of a vehicle, a smartphone held by an individual, and a specialized device held or worn by a user. The receiver 120 includes a non-transitory computer-readable media that stores the associated user's lighting profile, and includes electronics to communicate the lighting profile over a wireless communication network 130. Any known or yet-to-be-developed wireless communication protocols may be utilized to transmit the lighting profile from the receiver 120 to the lighting system 100.

Figure 2:
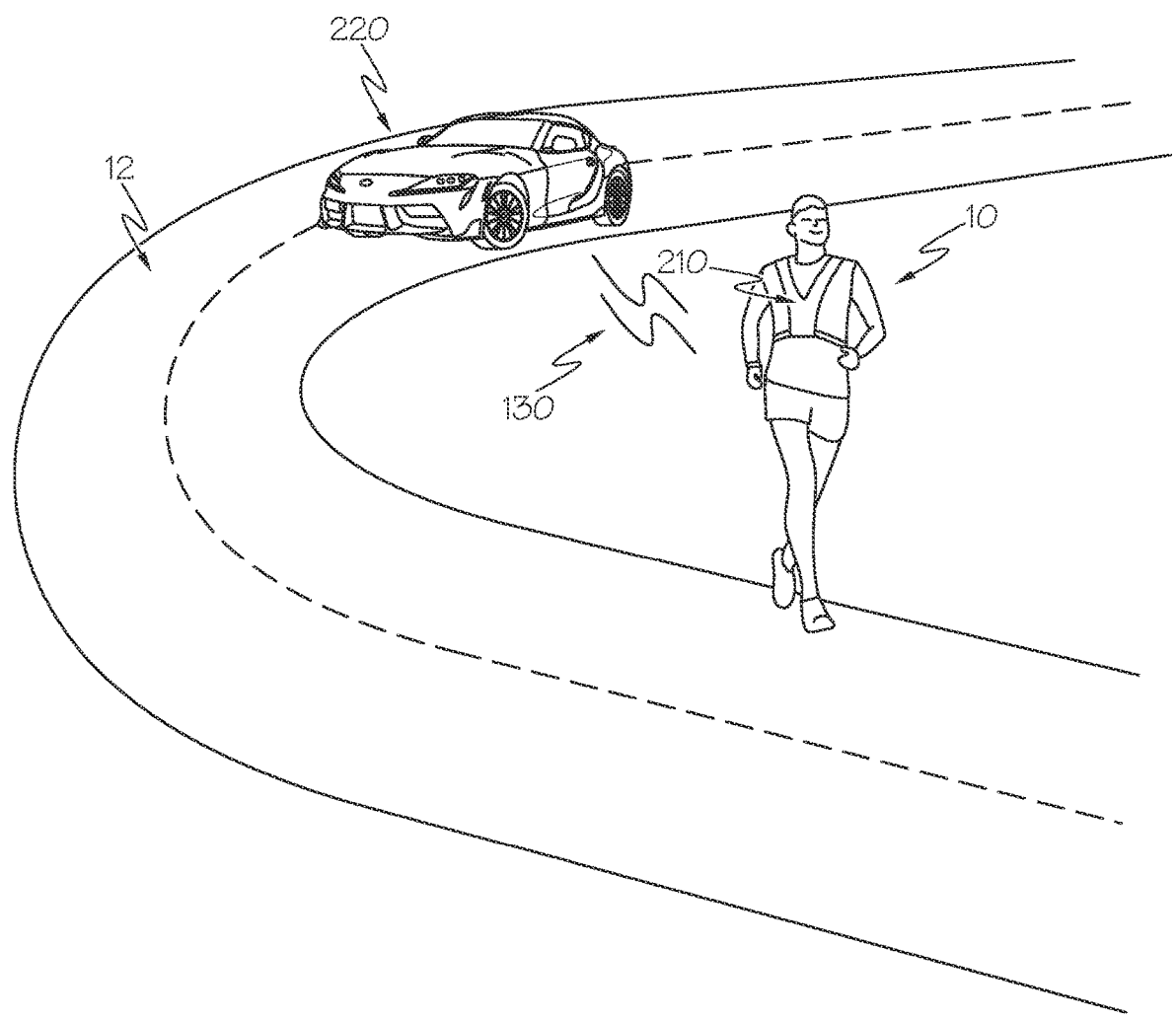
FIG. 2 illustrates an example lighted running vest and vehicle defining a lighting system and a receiver, respectively, according to one or more embodiments described and illustrated herein.

FIG. 2 illustrates an example use case where the lighting system is configured as a lighted running vest 200 worn by a user 10. The lighted running vest 200 has a plurality of light sources (not shown) on or embedded within the material of the lighted running vest 200. The lighted running vest is capable of producing light at various wavelengths, frequencies, duty cycles and brightness.

In this example, the user 10 is running on a road 12 which is also shared by a vehicle 220 that is coming from behind the user 10 around a bend in the road 12. It should be understood that the vehicle 220 may also be an oncoming vehicle that approaches the user 10 from a direction opposite of the travel direction of the user 10 (or other directions, such as perpendicular or angled directions). In this scenario, the vehicle 220 is the receiver. It is advantageous for the driver of the vehicle 220 to see the user by way of the lighted running vest 200 as soon as possible. The driver of the vehicle 220 has a preferential lighting pattern that he or she responds most quickly to. This lighting pattern may be stored within non-transitory computer-readable medium of the vehicle 220, and transmitted to the lighted running vest 200 over a wireless communication network 130, such as long range Bluetooth® or a vehicle-to-everything (V2X) wireless communication protocol.

The running vest 200 receives the lighting profile from the vehicle 220 and controls the one or more LEDs to operate at the preferred lighting pattern of the driver of the vehicle 220. In this manner, the driver of the vehicle 220 may quickly see the user 10 wearing the running vest 200 and maneuver the vehicle 220 accordingly.

Figure 3:
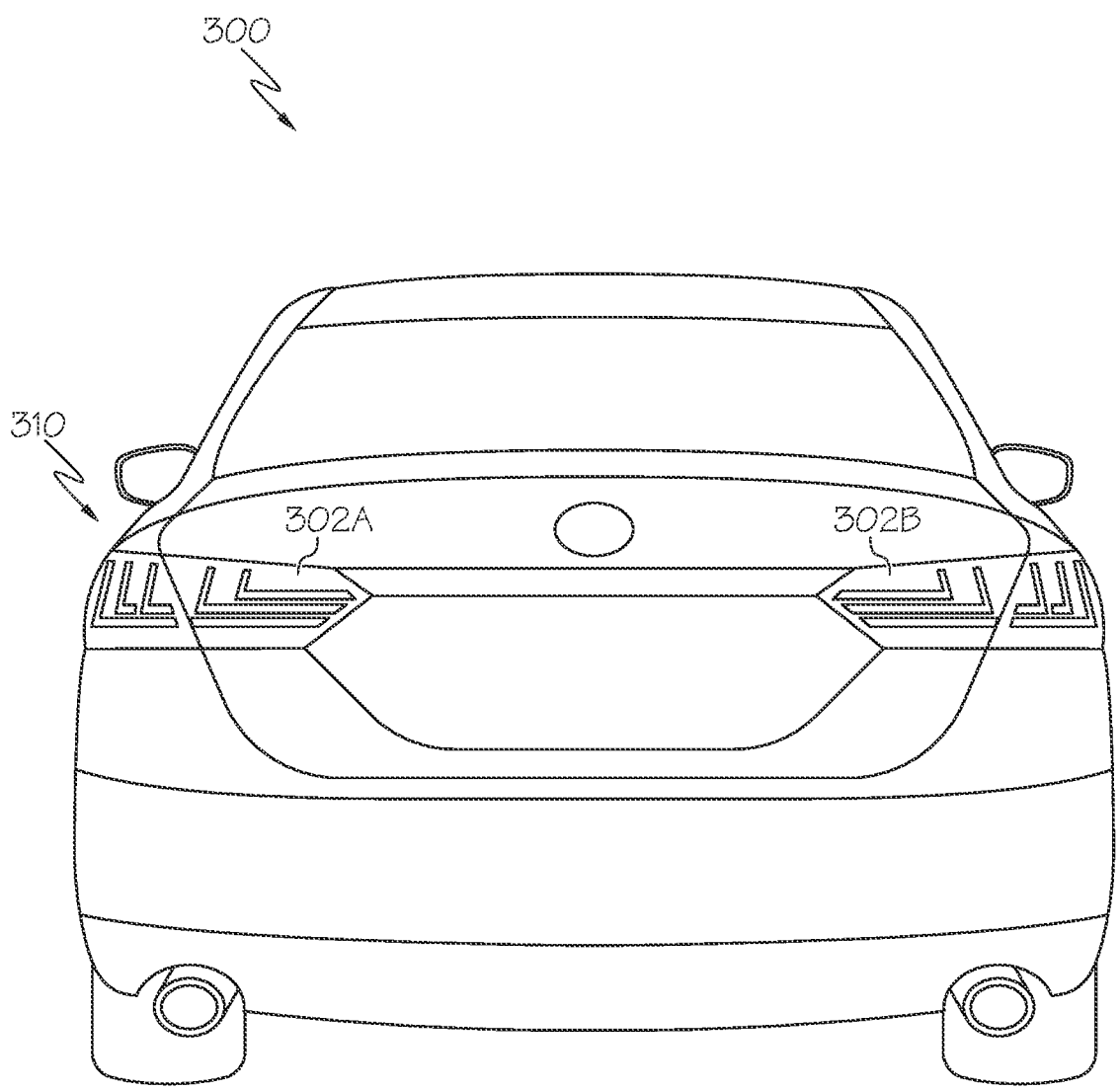
FIG. 3 illustrates a lighting system of a vehicle according to one or more embodiments described and illustrated herein.

Referring now to FIG. 3, a non-limiting example of a lighting system configured as a vehicle 300 is illustrated. The vehicle includes two brake lights 302A, 302B that each include one or individual light sources. It should be understood that embodiments are not limited to brake lights, and that other lights of the vehicle may also be utilized, such as headlights, turn signals and the like. The brake lights 302A, 302B are configured to operate according to variable parameters that define different lighting patterns, such as wavelength, frequency, duty cycle, brightness, movement of lights (e.g., lights appearing to move back and forth or up and down), sequentially blinking lights and/or the like. Like the embodiments described above, the vehicle 300 may receive a lighting profile of a vehicle or other device that is nearby. The vehicle 300 may then operate the brake lights 302A, 302B according to the lighting profile. As a non-limiting example, the receiver may be a vehicle directly behind the vehicle 300 (i.e., the tailgating vehicle). The tailgating vehicle may store the lighting profile of its driver, and transmit the lighting profile to the vehicle 300. It should be understood that the receiver may also be an oncoming vehicle.

It is noted that, in certain jurisdictions there may be requirements as to the wavelength (i.e., color) for brake lights. In such jurisdictions, lights having other wavelengths/colors may be provided in proximity to the brake lights to provide enhanced lighting.

In some embodiments, the headlights, daytime running lights, and/or other front-of-vehicle lights can be operated at an optimal pattern to enhance conspicuity in the daylight for other drivers, pedestrians or other road agents. Thus, these front-of-vehicle lights may produce a unique forward lighting pattern at all times (or select times, such as morning, dusk or other low-light periods and/or locations) that is optimized for detection by other road agents.

Referring once again to FIG. 1, in some instances, there may be more than one receiver 120 in proximity to the lighting system 100. The lighting system 100 may be programmed to receive multiple lighting profiles from multiple receivers 120, and operate the one or more light source 102 by cycling through the different lighting profiles, or by simultaneously presenting two lighting patterns at once using multi-view pixels that direct different-colored lights to different viewing zones. Such multi-view pixels may present different lighting profiles based on the field-of-view of the receiver.

The lighting system 100 may prioritize some lighting profiles over others according to different criteria (e.g., based on a proximity or location of the receiver 120 to the lighting system). The lighting profile may also include one more handicap of the associated user, such as vision issues or cognitive impairments. The lighting system 100 may prioritize lighting profiles most receptive to those with vision or cognitive impairments over others in the surrounding area because those users with impairments may respond more slowly to the lighting pattern. The lighting profile may also account for the driving record of individuals, particularly for those having multiple rear collisions.

It should be understood that embodiments of the present disclosure may also be used to lower the conspicuity toward certain individuals in certain situations. In such situations, it may be desirable to have a lighting pattern that is less conspicuous for one road agent and more conspicuous for another road agent. In this manner, the lighting pattern can be targeted only toward a particular road agent(s). As a non-limiting example, a following vehicle may be traveling behind a lead vehicle, and there is also a runner on the side of the road. The lighting system may determine that a lighting pattern emitted by the brake lights of the leading vehicle should be less conspicuous than the lighting profile shown on the runner's lighted vest based on the priority consideration of the fact that the runner is more vulnerable to injury. In this case, the lighting pattern of the brake lights of the leading vehicle may be adjusted so that it is less conspicuous than the lighting profile of the runner's lighted vest.

In some cases, the lighting pattern produced by the lighting system 100 may depend on ambient lighting conditions of the environment in which the lighting system 100 is operating. Some individuals may respond differently to different lighting patterns based on the ambient lighting conditions, such as the time of day. Further, surrounding lights such as Christmas lights or other lighting decorations may impact how well an individual can notice the lighting pattern produced by the lighting system 100. For example, if nearby Christmas lights are blue, a lighting profile that provides for blue lights may not be as noticeable as they should be because the individual associated with the receiver may not be able to discern between the blue lights of the lighting system 100 and the blue Christmas lights.

The lighting pattern produced by the lighting system 100 may also depend on a determined field-of-view of the receiver 120, for example. A user associated with a receiver 120 may be particularly responsive to a lighting pattern at a first field-of-view but not as responsive to the same pattern at a second field-of-view of the lighting system. In the example of FIG. 2, the field-of-view of the vehicle 220 with respect to the lighted running vest 200 changes as the vehicle 220 traverses the bend in the road 12. The lighting pattern produced by the lighted running vest 200 may change based on the field-of-view of the vehicle as it curves around the bend and approaches the user 10.

As another example, lights of a vehicle, such as the vehicle 300 of FIG. 3, may be controlled depending on the field-of-view of multiple receivers in the area. For example, portions of a brake light of a vehicle that are not in the field-of-view of a following vehicle may be controlled according to a lighting pattern for drivers of other vehicles, such as those on the sides of the vehicle 300. Thus, the field-of-view may be factor in which lighting patterns are illuminated.

In some embodiments, the lighting system 100 includes one or more light sensors 103 capable of detecting lighting ambient conditions. Embodiments are not limited by the type of light sensor. The one or more light sensors 103 may be a simple photocell operable to only detect ambient light levels, or a camera sensor able to detect individual light sources, such as Christmas lights. The receiver 120 may store different lighting profiles for different ambient lighting conditions. For example, one lighting profile may be associated with twilight, another lighting profile may be associated with black night, and yet another lighting profile may be associated with city driving with artificial light such as street lights, store lights, and the like. Any number of lighting profiles may be stored. The lighting profile that is sent to the lighting system 100 may be based on feedback from the one or more light sensors 103.

As another example, the feedback from the one or more light sensors 103 may be used to modify a lighting profile. Using the blue Christmas light example from above, if the lighting profile calls for blue lights, and the one or more light sensors 103 detect blue Christmas lights nearby, the receiver may modify the lighting profile to a different color (e.g., orange because it is directly opposite from blue on the color wheel) and then transmit the modified lighting profile to the lighting system 100.

Figure 4:
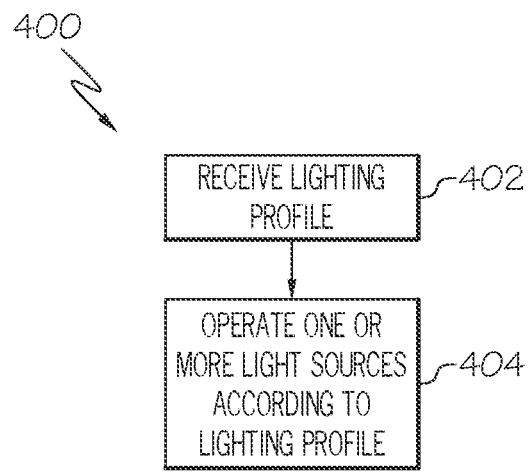
FIG. 4 illustrates a method of producing a lighting pattern with a lighting system according to one or more embodiments described and illustrated herein.

Referring now to FIG. 4, a flowchart 400 illustrating a non-limiting method of operating a lighting system having one or more light sources is provided. At block 402, the lighting system receives a lighting profile. The lighting profile may be received from a receiver over a wireless communication network, for example. As stated above, the lighting profile includes lighting parameters that cause the lighting system to produce a lighting pattern. At block 404, the lighting system controls the one or more light sources to emit optical radiation according to the lighting profile to produce the lighting pattern.

The lighting pattern may be developed in a variety of ways. In one example, a graphical user interface is presented to the user for the user to select lighting parameters to develop the lighting profile. The graphical user interface may ask the user questions, such as "What is your favorite color?" "Do you like fast blinking lights?" and the like. As another example, the graphical user interface may produce different lighting patterns with different lighting profiles and the user may pick the lighting pattern that they like the best.

Figure 5:
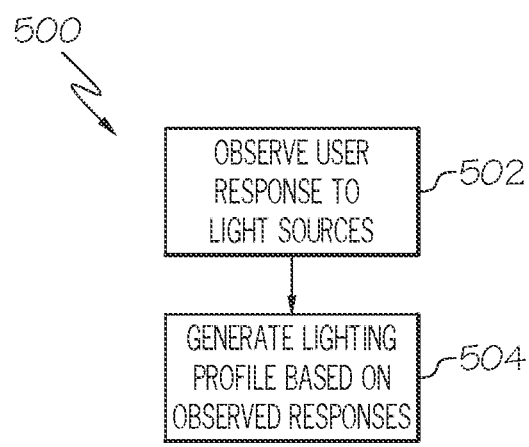
FIG. 5 illustrates a method of generating a lighting profile according to one or more embodiments described and illustrated herein.

As yet another example, the lighting profile may be developed experimentally, as shown by the flowchart 500 of FIG. 5. At block 502, different lighting patterns are produced (e.g., at varying locations on an electronic display). A gaze tracker may monitor the gaze direction of the user and calculate the amount of time it takes for a user to gaze at the lighting patterns. The lighting pattern with the fastest response time of the user may be selected for the lighting profile at block 504. Lighting profiles may also be developed over time using historical data from real-world driving. A gaze tracker within the vehicle can monitor the response times of users in particular situations, such as how a driver brakes in response to certain lighting patterns or colors when following a vehicle. For example, the driver's vehicle may be equipped with a camera that can monitor the parameters of the brake lights of a braking vehicle (e.g., color, refresh frequency, pattern, brightness, and the like). The data from the camera and the gaze tracking system may determine which lighting parameters causes the driver to brake the fastest during real-world driving. Such information can be used to develop the lighting profile.

In some embodiments, lighting profiles of a user are generated by machine learning using a trained model. Real-world or experimental data may be used to iteratively train the trained model. The trained model may be trained on many different users over time, or on a single user for which the lighting profile is being generated. The features such as driver reaction time, observed lighting patterns, time of day, weather conditions, traffic conditions and the like may be used as inputs into the trained model. The trained model can then calculate real-time lighting patterns based on current conditions.

The trained model is configured to output one or more lighting profiles for a user based on one or more different driving situations, for example.

Figure 6:
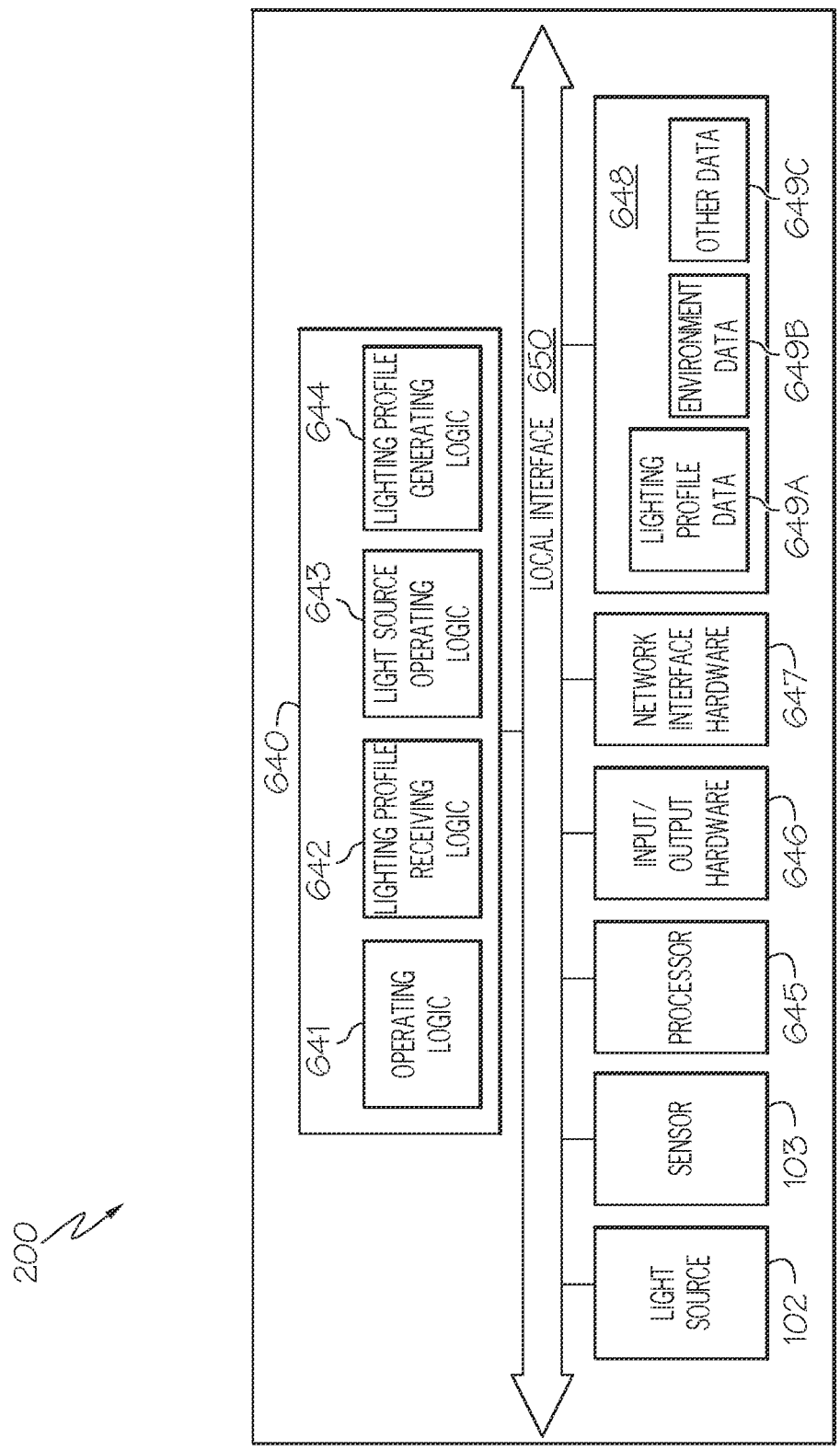
FIG. 6 illustrates an example computing system of a lighting system according to one or more embodiments described and illustrated herein.

Embodiments of the present disclosure may be implemented by a computing device, and may be embodied as computer-readable instructions stored on a non-transitory memory device. Referring now to FIG. 6, an example system 600 for receiving a lighting profile and producing a lighting pattern is schematically illustrated. While in some embodiments, the system 600 may be configured as a general purpose computer with the requisite hardware, software, and/or firmware, in some embodiments, the computing device 600 may be configured as a special purpose electronic device designed specifically for performing the functionality described herein. It should be understood that the software, hardware, and/or firmware components depicted in FIG. 6 may also be provided in other computing devices external to the system 600 (e.g., data storage devices, remote server computing devices, and the like).

As also illustrated in FIG. 6, the system 600 (or other additional computing devices) may include a processor 645, input/output hardware 646, network interface hardware 647, a data storage component 648 (which may include lighting profile data 649A (e.g., lighting parameters), environment data 649B (e.g., data relating to illumination within the environment), and any other data 649C for performing the functionalities described herein, and a non-transitory memory component 640. The memory component 640 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components.

Additionally, the memory component 640 may be configured to operating logic 641, store lighting profile receiving logic 642 for receiving a lighting profile, light source operating logic 643 for controlling one or more light sources 102 according to the lighting profile, and lighting profile generating logic 644 for generating and transmitting a lighting profile to another lighting system (each of which may be embodied as computer readable program code, firmware, or hardware, as an example). It should be understood that the data storage component 648 may reside locally to and/or remotely from the system 600, and may be configured to store one or more pieces of data for access by the system 600 and/or other components.

A local interface 650 is also included in FIG. 6 and may be implemented as a bus or other interface to facilitate communication among the components of the system 600.

The processor 645 may include any processing component configured to receive and execute computer readable code instructions (such as from the data storage component 648 and/or memory component 640). The input/output hardware 646 may be a graphics display device, keyboard, mouse, printer, camera, microphone, speaker, touch-screen, and/or other devices for receiving, sending, and/or presenting data. The network interface hardware 647 may include any wired or wireless networking hardware, such as a modem, LAN port, wireless fidelity (Wi-Fi) card, WiMax card, mobile communications hardware, and/or other hardware for communicating with other networks and/or devices, such as for transmitting and receiving the lighting profile.

The components illustrated in FIG. 6 are merely exemplary and are not intended to limit the scope of this disclosure. More specifically, while the components in FIG. 6 are illustrated as residing within the system 600, this is a non-limiting example. In some embodiments, one or more of the components may reside external to the system 600.

It should now be understood that embodiments of the present disclosure are directed to lighting systems that receive a lighting profile from a nearby user, and operate one or more light sources according to the lighting profile. The lighting profile corresponds to a lighting pattern best suited for the user to be able to quickly notice the lights of the lighting system. In this matter, the lighting system can optimally produce a lighting pattern that is best received by the user. The lighting profile can be developed by a user inputting parameters into a graphical user interface, or be generated experimentally by viewing many different lighting patterns and observing the response times of the user. The lighting system can be used in many applications, such as lighting vests, signs, warning lights, and vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A lighting system comprising:
a material configured to be worn by a user;
one or more light sources disposed on or within the material;
one or processors;
a non-transitory computer-readable medium storing instructions that, when executed by the one or more processors, causes the one or more processors to:
receive a lighting profile from a component of a vehicle not operated by the user and within visible range of the user; and
control the one or more light sources according to the lighting profile.

2. The lighting system of claim 1, wherein the lighting profile establishes one or more of a wavelength, duty cycle, frequency, ramp-up time, ramp-down time, and pattern.

3. The lighting system of claim 1, wherein the lighting profile is learned from historical data.

4. The lighting system of claim 1, wherein the lighting profile is set by an individual within the vehicle.

5. A method of operating a lighting system worn by a user, the method comprising:
receiving a lighting profile from a component of a vehicle, wherein the vehicle is not operated by the user and the vehicle is within a visible range of the user; and
controlling one or more lights of the lighting system according to the lighting profile.

6. The method of claim 5, wherein the lighting profile establishes one or more of a wavelength, duty cycle, frequency, and pattern.

7. The method of claim 5, wherein the lighting profile is learned from historical data.

8. The method of claim 5, wherein the lighting profile is set by an individual within the vehicle.

9. The lighting system of claim 1, wherein the lighting system is a clothing article.

10. The lighting system of claim 9, wherein the clothing article is a vest.

11. The lighting system of claim 1, wherein the lighting profile is such that the one or more light sources are controlled to produce a biomotion-animation.

12. The lighting system of claim 1, wherein the one or more light sources are one or more light emitting diodes.

13. The method of claim 5, wherein the lighting system is a clothing article.

14. The method of claim 13, wherein the clothing article is a vest.

15. The method of claim 5, wherein the lighting profile is such that the one or more light sources are controlled to produce a biomotion-animation.

16. The method of claim 1, wherein the one or more lights are one or more light emitting diodes.

* * * * *

UNITED STATES PATENT AND TRADEMARK OFFICE
CERTIFICATE OF CORRECTION

| | | |
|---|---|---|
| PATENT NO. | : 12,464,624 B2 | Page 1 of 1 |
| APPLICATION NO. | : 18/322179 | |
| DATED | : November 4, 2025 | |
| INVENTOR(S) | : Benjamin Piya Austin et al. | |

It is certified that error appears in the above-identified patent and that said Letters Patent is hereby corrected as shown below:

On the Title Page

Column 2, item (57), Line(s) 2, delete "one or processors" and insert --one or more processors--, therefor.

Page 2, Column 1, item (56), U.S. patent documents, cite no. 4, delete "Watson" and insert --Watson et al.--, therefor.

Signed and Sealed this
Thirteenth Day of January, 2026

John A. Squires
*Director of the United States Patent and Trademark Office*